Dec. 10, 1929.                J. P. HANNA                1,738,701
                       LIQUID DISPENSING APPARATUS
                        Filed April 13, 1928    2 Sheets-Sheet 2
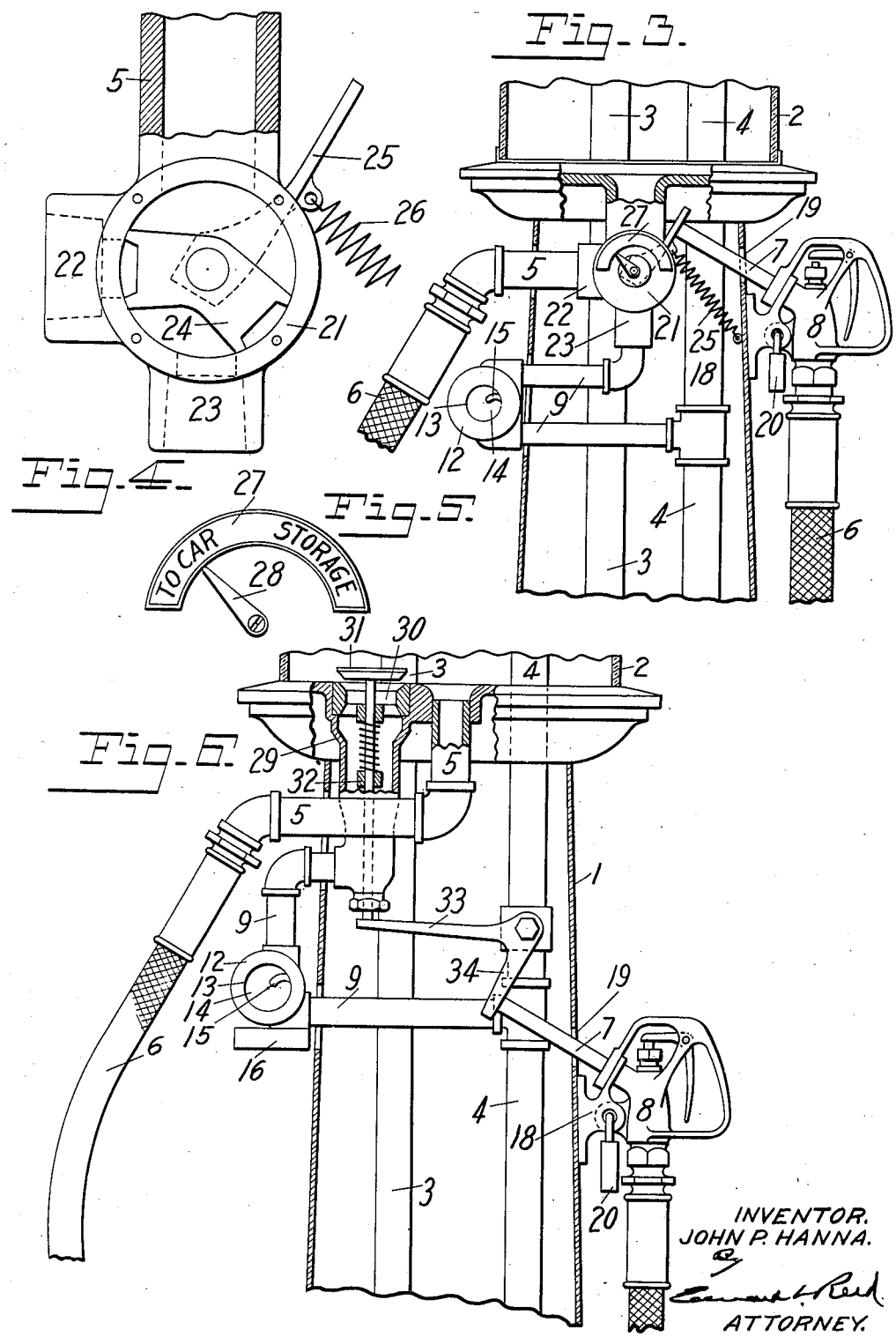
INVENTOR.
JOHN P. HANNA.
ATTORNEY.

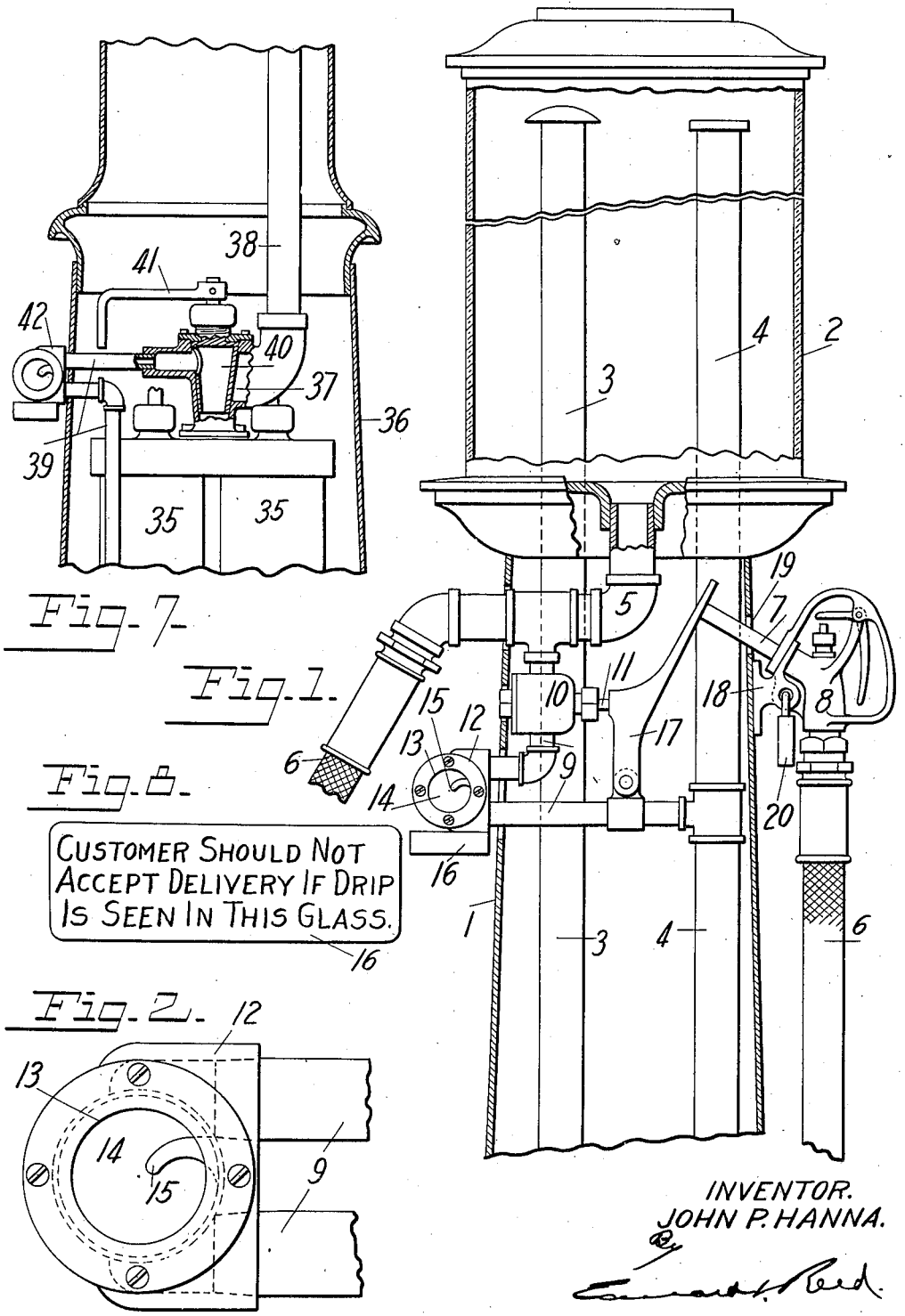

Patented Dec. 10, 1929

1,738,701

UNITED STATES PATENT OFFICE

JOHN P. HANNA, OF DAYTON, OHIO, ASSIGNOR TO NATIONAL RECORDING PUMP COMPANY, OF DAYTON, OHIO, A CORPORATION OF OHIO

LIQUID-DISPENSING APPARATUS

Application filed April 13, 1928. Serial No. 269,682.

This invention relates to liquid dispensing apparatus and more particularly to means for preventing the delivery of short measure to the customer by diverting a portion of the measured quantity of liquid back to the storage receptacle.

Certain types of liquid dispensing apparatus and more particularly the visible type of gasoline pump, are provided with return pipes through which the contents of the measuring or delivery receptacles may be drained back to storage, or to some other suitable point of discharge. This return pipe is controlled by a valve which is supposed to be closed when the pump is being operated. Should this valve fail to properly seat so that there would be a leakage about the same, or should the operator accidentally or fraudulently partially open the same a portion of the liquid would be diverted back to the storage receptacle and the customer would receive less than the measured quantity.

One object of the invention is to provide means for indicating to the customer the passage of any liquid through the return pipe regardless of how small the quantity may be.

A further object of the invention is to provide such an indicating device which will be simple in its construction and operation and inexpensive to install and which will have no moving parts to become broken or disarranged.

A further object of the invention is to provide such a dispensing apparatus with a device for actuating the valve in the return pipe, of such a character and so arranged that it cannot be conveniently manipulated by the operator except by the placing of the nozzle of the delivery hose in an inoperative position.

Other objects of the invention will appear as the device is described in detail.

In the accompanying drawings Fig. 1 is a vertical sectional view, partly broken away, of a liquid dispensing apparatus embodying my invention; Fig. 2 is a detail view of the indicator; Fig. 3 is a vertical sectional view of a portion of a dispensing apparatus showing a slightly modified arrangement of the valve and its actuating mechanism; Fig. 4 is a detail view of the valve shown in Fig. 3; Fig. 5 is a detail view of the device to indicate the position of the valve; Fig. 6 is a vertical sectional view of a portion of the dispensing apparatus showing another arrangement of the valve and valve actuating mechanism; Fig. 7 is a vertical sectional view of a portion of a blind pump showing the invention applied thereto; and Fig. 8 is a detail view of the notice associated with the indicating device.

In these drawings I have shown several embodiments of my invention, illustrating the same both as applied to a visible pump, in which the liquid is measured in a transparent receptacle, and to a blind pump in which the liquid is delivered directly from the measuring cylinders of the pump to the customer. It will be understood that the particular embodiments here shown have been chosen for the purpose of illustration only and that the device may take various forms and may be applied to dispensing apparatus of various kinds without departing from the spirit of the invention.

In Fig. 1 I have illustrated the invention as applied to a gasoline pump of the visible type. As there shown, the pump comprises a hollow standard or housing 1 upon the upper end of which is mounted a transparent delivery receptacle 2, which usually constitutes a measuring receptacle. The liquid is supplied to the delivery receptacle from the storage tank through a supply pipe 3 by means of a pump, not shown. An overflow pipe 4 leads from the upper part of the delivery receptacle to the storage tank to return any excess of liquid which may be pumped into the delivery receptacle. The receptacle is provided in its lower part with a delivery outlet or pipe 5 which is connected with a delivery hose 6, having a discharge nozzle 7, through which a measured quantity of liquid may be discharged to the customer's receptacle. The flow of liquid through the hose 6 is controlled by a valve and, in the present instance, I have illustrated what is known as a wet hose, that is, the valve 8 is arranged in the nozzle and the hose will be full of liquid when the pump is idle. It will be obvious, however, that the invention is equally applicable to a pump of the dry hose type, that is, in which the valve is interposed in the delivery pipe 5 in advance of the hose and the hose is drained at the end of each delivery of liquid.

A return pipe 9 is connected with the delivery receptacle and with the storage tank, or other suitable point of discharge, to enable the contents of the delivery receptacle to be drained if and when desired, as when the pump is to remain idle for a considerable period of time. This return pipe may be connected with the receptacle and with the storage tank in any suitable manner. In Fig. 1 I have shown it as connected with the delivery pipe 5 and with the overflow pipe 4. The passage of liquid through the return pipe is controlled by a valve 10 which is normally closed and which is provided with a stem 11 by means of which it may be actuated. Interposed in the return pipe, preferably beyond the valve 10, is an indicating device of such a character that the passage of any liquid through the return pipe, however small in quantity, will be indicated to the customer. Preferably this indicating device comprises a sight opening through which liquid passing through the return pipe will be visible. In the arrangement here shown the return pipe has a portion in the form of a loop which extends laterally beyond the housing 1 and the outer part of this loop comprises a casing 12 having a sight opening 13 provided with a transparent closure 14. The liquid enters at the top of the casing and must flow downwardly past the sight opening in order to escape through the overflow pipe. In order to more clearly indicate the passage or drip of small quantities of liquid the arrangement is such that the liquid will be discharged into the casing near the center thereof and to this end I have here shown the casing as provided with an inwardly extending lip 15 which will conduct the liquid that enters the casing to a point near the center line of the sight opening and it will flow or drip from this lip past the sight opening to the lower part of the casing. If desired, a notice to the customer may be arranged adjacent to the indicating device, as shown at 16 in Figs. 1 and 8.

I have also shown the valve 10 as provided with an actuating device of such a character and so arranged that the valve will be automatically opened when the apparatus is locked against operation, as by locking the nozzle in an inoperative position, and of such a character that it will be difficult for the operator to manipulate the valve while liquid is being delivered to the customer. As here shown, the actuating device is in the form of a lever 17 which, in the present instance, is pivotally mounted on the return pipe 9 and has an inclined upper portion. Mounted adjacent to the valve and preferably on the housing 1 is a supporting bracket 18 adapted to receive and support the nozzle 8 when the pump is idle. Immediately above this bracket an opening 19 is formed in the wall of the housing through which the nozzle 7 may be inserted and caused to contact with the valve actuating lever 17. When the pump is to be locked up the nozzle is inserted through the opening 19 in the housing and caused to engage the lever 17 and the nozzle is then moved downwardly into supporting engagement with the bracket 18, thereby moving the lever about its axis and opening the valve, and retaining the valve open so long as the nozzle remains on the supporting bracket. If desired, the nozzle and the bracket may have parts provided with registering openings to receive a locking device, such as a padlock 20. It will be apparent that the only way in which the operator could actuate the valve 10 without inserting the nozzle through the opening in the housing would be by inserting a stick or a similar device through the opening and any such action on the part of the operator during the delivery of liquid would immediately attract the attention and excite the suspicion of the customer, and should the operator fasten the valve in a partly open position this fact will be disclosed by the passage of liquid through the indicator. Further, whenever the nozzle is locked in its inoperative position, as when the apparatus is locked up for the night, the valve will be opened and the delivery receptacle drained automatically.

In Fig. 3 I have shown an arrangement of the mechanism which is substantially the same as that shown in Fig. 1 with the exception of the valve. In this form of the device I have interposed a two-way valve in the delivery pipe and have so arranged the same that it will control both the delivery of liquid to the customer and the passage of liquid through the return pipe 9. This valve is shown at 21 and is illustrated in detail in Fig. 4. As there shown, it comprises a cylindrical valve casing connected at its upper end with the delivery receptacle 2 and having an outlet 22 leading to the hose and a second outlet 23 connected with the return pipe 9. Pivotally mounted within the casing is a valve member 24 of such a character that when in one position it will close the outlet 23 and open the outlet 22 and when in its other position will close the outlet 22 and open the outlet 23. Connected with this valve member is a lever 25 which is acted upon by a spring 26 to hold the same normally in a position to close the outlet leading to the return pipe and open the outlet leading to the hose. The lever 25 is arranged in line with the opening 19 in the housing 1 and will be engaged and actuated by the nozzle in the manner above described. As shown in Figs. 3 and 4 the valve is in the position to which it will be moved by the nozzle, that is, to connect the delivery receptacle 2 with the return pipe. When the nozzle is withdrawn the spring 26 will shift the valve member 24 to close the outlet 23 which leads to the return pipe and open the outlet 22 which leads to the hose. I have also associated with this valve a device to indicate to the customer the position of the valve. This device as here shown comprises an indicating plate 27 mounted on the outer side of the housing 1 adjacent to the valve and a pointer 28, which is connected with the shaft of the valve member, moves over this indicating plate, and when the valve is in one position points to the legend "to car" and when the valve is in the other position points to the legend "storage".

In that form of the device shown in Fig. 6 the return pipe 9 is connected with the delivery receptacle independently of the delivery pipe 5 and for this purpose a tubular member or conduit 29 is interposed between the return pipe and the delivery receptacle and communicates with the receptacle through a port 30 which is controlled by a poppet valve 31. The stem 32 of the valve 31 extends downwardly through the tubular member 29 and is engaged at its lower end by one arm 33 of a bell crank lever, the other arm 34 of which is arranged to be engaged by the nozzle 7 when the latter is inserted through the opening 19 in the housing 1. It will be understood that any suitable form of valve may be employed in connection with any of the arrangements here shown, whether the return pipe is connected with the receptacle through the delivery pipe or separately therefrom.

In the operation of a blind pump, in which the liquid is measured in the pump cylinders, the delivery of the desired quantity of liquid is sometimes completed before the piston in the cylinder completes its stroke, and, particularly in a duplex pump, means are often provided for returning to storage, or to the lower end of the pumping cylinder, that portion of the liquid which remains in the cylinder above the piston. In Fig. 7 I have shown one embodiment of such a pump and as there shown a pair of measuring cylinders 35 are mounted within the housing 36, suitable means, not here shown, being provided for operating the pistons of these cylinders simultaneously in opposite directions. Both cylinders are connected through a valve chamber 37 with a delivery pipe 38. Leading from this valve chamber 37 is a return pipe or by-pass 39, the discharge end of which may be connected either with the intake end of the cylinders or with the storage tank. A valve 40 mounted in the valve chamber 37 is adapted to connect the cylinders either with the delivery pipe 38 or the return pipe 39, this valve being provided with a handle 41 for actuating the same. An indicating device 42 similar to the indicating device above described is interposed in the return pipe and will indicate to the customer any leakage about the valve member 40.

While I have shown and described one embodiment of my invention I wish it to be understood that I do not desire to be limited to the details thereof as various modifications may occur to a person skilled in the art.

Having now fully described my invention, what I claim as new and desire to secure by Letters Patent, is:

1. In a liquid dispensing apparatus comprising a delivery outlet, a return pipe and a valve to control the flow of liquid through said return pipe, a device interposed in said return pipe to indicate any passage of liquid therethrough.

2. In a liquid dispensing apparatus comprising a delivery outlet, a return pipe and a valve to control the flow of liquid through said return pipe, an indicator interposed in said return pipe and comprising a part having a sight opening, and a transparent closure for said sight opening, said indicator being so arranged that any liquid passing through said return pipe will be visible through said sight opening.

3. In a liquid dispensing apparatus comprising a delivery outlet, a return pipe and a valve to control the flow of liquid through said return pipe, a casing interposed in said return pipe and having a sight opening, and a transparent closure therefor, said casing having its inlet arranged in the upper portion thereof to discharge the liquid in line with said sight opening.

4. In a liquid dispensing apparatus comprising a delivery outlet, a return pipe, and a valve to control the flow of liquid through said return pipe, a casing interposed in said return pipe and having a sight opening, a transparent closure therefor, said casing having its inlet arranged in the upper portion thereof and having a lip extending inwardly from said inlet to conduct the liquid to a point near the center of said sight opening.

5. In a liquid dispensing apparatus, comprising a delivery outlet, a return pipe, a valve to control the flow of liquid through said return pipe, and a housing, said return pipe being arranged within said housing and having a loop extending laterally beyond said housing, the outer portion of said loop comprising a part having a sight opening, and a transparent closure for said sight opening.

6. In a liquid dispensing apparatus, a delivery receptacle, a delivery outlet leading from said receptacle to a hose, a return pipe to drain said receptacle independently of said hose and a valve to control the flow of liquid through said return pipe, a device interposed in said return pipe beyond said valve and having a sight opening, and a transparent closure for said opening, said device being so arranged that any liquid passing through said return pipe must pass in front of said sight opening.

7. In a liquid dispensing apparatus comprising a delivery receptacle, a delivery outlet leading from said receptacle, a hose connected with said outlet, a nozzle on said hose, a return pipe leading from said receptacle, a normally closed valve for said return pipe, a device interposed in said return pipe to indicate the passage of liquid therethrough, a supporting device for said nozzle, and an actuating device for said valve having a part arranged to be actuated by said nozzle when the latter is placed on said supporting device.

8. In a liquid dispensing apparatus comprising a delivery receptacle having an outlet, a hose connected with said outlet, a nozzle for said hose, a return pipe leading from said receptacle, and a valve to control the flow of liquid through said return pipe, an actuating device for said valve, and a nozzle supporting member mounted adjacent to said valve actuating device, said nozzle supporting member being so arranged with relation to said valve actuating device that when said nozzle is supported on said supporting member the discharge end will engage said valve actuating device and hold the valve in its open position.

9. In a liquid dispensing apparatus comprising a delivery receptacle having an outlet, a hose connected with said outlet, a nozzle for said hose, a return pipe leading from said receptacle, and a valve to control the flow of liquid through said return pipe, a nozzle supporting member mounted adjacent to said valve, and a valve actuating device comprising a lever movable with relation to said nozzle supporting member and so arranged that it will be engaged and actuated by the discharge end of said nozzle when the latter is placed in engagement with said nozzle supporting member.

10. In a liquid dispensing apparatus comprising a housing, a delivery receptacle, a delivery pipe leading from said receptacle, a hose connected with said delivery pipe, a nozzle on said hose, a return pipe connected with said delivery receptacle, a two-way valve to control the flow of liquid through said delivery pipe and said return pipe, a valve actuating device connected with said valve, a supporting device for said nozzle separate from said valve actuating device, said housing having an opening therethrough adjacent to said nozzle supporting device through which the end of said nozzle is inserted when said nozzle is placed on said supporting device, said valve actuating device being arranged to be engaged and actuated by said nozzle.

11. In a liquid dispensing apparatus comprising a housing, a delivery receptacle supported above said housing, a delivery pipe leading from said receptacle, a hose connected with said delivery pipe, a nozzle for said hose, a return pipe leading from said receptacle and a valve to control the flow of liquid through said return pipe, a part interposed in said return pipe beyond said valve and provided with a sight opening and having a transparent closure for said opening, a valve actuating device mounted within said housing and having operative connection with said valve, and a nozzle supporting device mounted on said housing, said housing having an opening adjacent to said nozzle supporting device adapted to receive the end of said nozzle when the latter is placed upon said supporting device, said valve actuating device being so arranged with relation to the last mentioned opening that it will be engaged and actuated by said nozzle when the latter is placed on said support.

12. In a liquid dispensing apparatus comprising a delivery receptacle having an outlet, a hose connected with said outlet, a nozzle for said hose, a return pipe leading from said receptacle, and a valve to control the flow of liquid through said return pipe, an actuating device for said valve, a stationary nozzle supporting member mounted adjacent to said valve actuating device, said nozzle supporting member being so arranged with relation to said valve actuating device that when said nozzle is supported on said supporting member the discharge end thereof will engage said valve actuating device and hold the valve in its open position, and means for locking said nozzle on said supporting member with the discharge end thereof in operative engagement with said valve actuating device.

13. In a liquid dispensing apparatus comprising a housing, a delivery receptacle supported above said housing, a delivery outlet leading from said receptacle, a hose connected with said delivery outlet, a nozzle for said hose, a return pipe leading from said receptacle, and a valve to control the flow of liquid through said return pipe, an actuating device for said valve arranged within said housing, said housing having an opening adjacent to said actuating device, a nozzle supporting member mounted exteriorly of said housing adjacent to said opening and adapted to support said nozzle when the end thereof has been inserted through said opening, said valve actuating device being so arranged that it will be engaged and actuated by that portion of said nozzle which is inserted through said opening when the nozzle is placed in engagement with said nozzle supporting member.

14. In a liquid dispensing apparatus comprising a housing, a delivery receptacle supported above said housing, a delivery outlet leading from said receptacle, a hose connected with said delivery outlet, a nozzle for said hose, a return pipe leading from said receptacle, and a valve to control the flow of liquid through said return pipe, a nozzle supporting device mounted on said housing exteriorly thereof, said housing having an opening adjacent to the supporting device to receive the discharge end of said nozzle when the latter is placed on said supporting device, and a valve actuating device comprising a lever mounted within said housing and arranged to be engaged and actuated by that portion of said nozzle which is inserted through said opening when the nozzle is placed in engagement with said nozzle supporting device.

In testimony whereof, I affix my signature hereto.

JOHN P. HANNA.